United States Patent
Yrjönen (10) Patent No.: US 10,443,575 B2
(45) Date of Patent: Oct. 15, 2019

(54) WIND TURBINE COMPRISING A PLANETARY GEAR SYSTEM

(71) Applicant: Vestas Wind Systems A/S, Aarhus N. (DK)

(72) Inventor: Janne-Pekka Yrjönen, Shanghai (CN)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/550,048

(22) PCT Filed: Feb. 25, 2016

(86) PCT No.: PCT/DK2016/050051
§ 371 (c)(1),
(2) Date: Aug. 10, 2017

(87) PCT Pub. No.: WO2016/146127
PCT Pub. Date: Sep. 22, 2016

(65) Prior Publication Data
US 2018/0238306 A1   Aug. 23, 2018

(30) Foreign Application Priority Data

Mar. 16, 2015  (DK) ................................ 2015 70151

(51) Int. Cl.
*F03D 15/00* (2016.01)
*F16H 57/08* (2006.01)

(52) U.S. Cl.
CPC .......... *F03D 15/00* (2016.05); *F16H 57/082* (2013.01); *F05B 2260/40311* (2013.01); *Y02E 10/722* (2013.01)

(58) Field of Classification Search
CPC .................. F03D 15/00; F16H 57/082; F05B 2260/40311
See application file for complete search history.

(56) References Cited

U.S. PATENT DOCUMENTS 2,084,843 A    6/1937  Harris
4,759,234 A *  7/1988  Premiski ................ F16C 17/10
                                                    384/905.1
(Continued)

FOREIGN PATENT DOCUMENTS

CN   2580136 Y   10/2003
CN   1846057 A   10/2006
(Continued)

OTHER PUBLICATIONS

European Patent Office, International Search Report and Written Opinion in PCT/DK2016/050051, dated Jun. 16, 2016.
(Continued)

*Primary Examiner* — Erin D Bishop
(74) *Attorney, Agent, or Firm* — Wood Herron & Evans LLP (57) ABSTRACT

A wind turbine generator includes a gearbox, wherein the gearbox includes a planetary gear system, wherein the planetary gear system includes a carrier assembly, wherein the carrier assembly includes a carrier supporting at least one planetary gear that is rotatably mounted through a bearing on a shaft, wherein the shaft is fixed in a bore defined by the carrier. The carrier assembly includes interlocking means to prevent angular movement of the shaft relative to the bore. This improves the robustness of the coupling between the shaft and the bore of the carrier.

6 Claims, 10 Drawing Sheets

(56) References Cited

U.S. PATENT DOCUMENTS

| | | | |
|---|---|---|---|
| 7,282,808 B2* | 10/2007 | Shibata | F16C 19/386 |
| | | | 290/55 |
| 8,425,374 B2* | 4/2013 | Smook | F16H 57/082 |
| | | | 475/331 |
| 2002/0077214 A1 | 6/2002 | Seo | |
| 2006/0293142 A1* | 12/2006 | Torres | F16C 19/543 |
| | | | 475/331 |
| 2011/0245031 A1* | 10/2011 | Saenz De Ugarte Sevilla | |
| | | | F03D 11/02 |
| | | | 475/347 |
| 2012/0017723 A1 | 1/2012 | Makulec et al. | |
| 2012/0196720 A1 | 8/2012 | Miyawaki et al. | |

FOREIGN PATENT DOCUMENTS

| | | | |
|---|---|---|---|
| CN | 102207060 A | | 10/2011 |
| EP | 2330315 A1 | | 6/2011 |
| EP | 2375067 A1 | | 10/2011 |
| GB | 696653 A | | 9/1953 |
| GB | 2514167 A | | 11/2014 |
| WO | 2014193296 A1 | | 12/2014 |

OTHER PUBLICATIONS

Danish Patent and Trademark Office, Search Report in PA 2015 70151, dated Oct. 16, 2015.

European Patent Office, Examination Report in EP Application No. 16707623.1, dated Oct. 22, 2018.

China National Intellectual Property Administration, First Notification of Office Action in CN Application No. 201680015691.X, dated Oct. 9, 2018.

China National Intellectual Property Administration, 2nd Notification of Office Action in CN Application No. 201680015691.X, dated Jun. 3, 2019.

* cited by examiner

WIND TURBINE COMPRISING A PLANETARY GEAR SYSTEM

TECHNICAL FIELD

The invention relates to a wind turbine generator comprising a planetary gear system and, more particularly, to a carrier assembly for a planetary gear system in which at least one planet gear is rotatably mounted to a carrier on a fixed shaft.

BACKGROUND TO THE INVENTION

Wind turbines typically include a rotor with large blades driven by the wind. The blades convert the kinetic energy of the wind into rotational mechanical energy. The mechanical energy usually drives one or more generators to produce electrical power. Thus, wind turbines include a power transmission system to process and convert the rotational mechanical energy into electrical energy.

Oftentimes it is necessary to increase the rotational speed of the wind turbine rotor to the speed required by the generator(s). This is accomplished by a gearbox between the wind turbine rotor and generator. Thus, the gearbox forms part of the power transmission system and converts a low-speed, high-torque input from the wind turbine rotor into a lower-torque, higher-speed output for the generator.

Gearboxes typically comprises one or more planetary gear systems, which are also referred to as 'epicyclic' gear systems and the two terms are considered to be synonymous.

As is known, a planetary gear system includes a ring gear, a sun gear, and a carrier assembly including a plurality of planet gears that are rotatably mounted to a carrier. In one common configuration of planetary gear system, each one of the planet gears are rotatably mounted to a fixed shaft or pin that is itself received in a bore defined in the carrier. A bearing is interposed between the planet gear and the shaft and allows for smooth rotation of the planet gear. It is important that the shaft does not rotate in its bore, so the shaft is secured in the bore usually by way of a screw thread engagement, or by way of an interference fit. An interference fit may be achieved by differential thermal loading of the shaft and the bore prior to assembly. Both types of coupling techniques between the shaft and bore are known in planetary gear systems that experience high loading in use. For example, planetary gear systems or 'sets' are often used in gearboxes of utility scale wind turbine generators, particularly as a first stage in a multi-stage gearbox due to their relative compactness and suitability for the high torque loads generated by the rotor of the wind turbine generator.

However, high loading combined with the dynamic deflections caused by the wind turbine generator torque and by the vibration behaviour observed in planet gears can cause problems with the coupling between the shafts of the planet gears and the bores within which they are received. For example, in the case of a shaft that is secured in the bore by a bolt, the bolt is vulnerable to shear forces generated by high torque loading and dynamic deflections. This can cause failure of the bolt and, secondary damage, also to the planet gear. Alternatively, in the case where the shaft is engaged in the bore by an interference fit, the torque loading may cause the shaft to move angularly in the bore which may lead to severe wear or fretting corrosion of the shaft and/or the bore.

It is against this background that the invention has been devised.

SUMMARY OF THE INVENTION

In one aspect, embodiments of the invention provide a wind turbine generator comprising a gearbox, wherein said gearbox comprises a planetary gear system, wherein said planetary gear system comprises a carrier assembly, wherein said carrier assembly comprises a carrier supporting at least one planetary gear that is rotatably mounted through a bearing on a shaft, wherein the shaft is fixed in a bore defined by the carrier; and wherein the carrier assembly includes interlocking means to prevent angular movement of the shaft relative to the bore.

By interlocking the shaft to the bore of the carrier, the shaft is preventing from moving angularly within the bore thereby preventing excessive wear and premature failure.

In one embodiment, the interlocking means comprises an interlocking element that extends over portions of adjacent surfaces defined respectively by the carrier and the shaft, and wherein, in one embodiment, the element is received in a complementary shaped recess defined by the portions of the adjacent surfaces defined by the carrier and the shaft.

In another embodiment, the interlocking element may be mounted to the carrier, wherein the interlocking element defines an engagement feature that interlocks with a complementary feature defined by the shaft. The interlocking element may take various forms, although in one embodiment the interlocking element extends over portion of the carrier and a portion of the shaft such that it effectively locks those two components together to prevent relative movement therebetween. The interlocking element may be mounted to the carrier, but it may also be mounted to the shaft. When mounted to the carrier, the engagement feature of the interlocking element is a portion of it that overlaps the shaft, wherein the complementary feature of the shaft is a recess defined in an end face of the shaft, the recess matching the overlapping portion of the interlocking element.

The interlocking element may be resilient so that it conforms to a stepped transition between the carrier and the shaft. In this way, the interlocking element also restrains axial movement of the shaft as well as angular movement. In this case, the interlocking element may have a resilient layer which conforms to a stepped transition between the carrier and the shaft.

Instead of the interlocking means being provided by a separate interlocking element, in another embodiment the interlocking means may be defined by a head portion of the shaft that is shaped so as to interlock with a complementary-shaped portion of the bore so as to prevent angular movement of the shaft relative to the bore. Although the interlocking means may be provided in various ways, in one embodiment the head portion of the shaft is shaped to define at least one flat section, and wherein the complementary-shaped portion of the bore is provided with a flat section to match the head portion of the shaft. Although a single flat section would function adequately, the head portion may defined other shapes, for example it could be shaped in a polygonal profile or with one or more lobes to engage with a complementary profile defined by the carrier bore.

In one embodiment, the head portion of the shaft includes a fastening point at which the head portion is joined to the carrier to restrain movement of the shaft relative to the bore along the longitudinal axis of the shaft.

BRIEF DESCRIPTION OF THE DRAWINGS

In order for the invention to be more fully understood, it will now be described by way of example only with reference to the following drawings, in which:

FIG. 5b is an enlarged section view along the line B-B in FIG. 5a.

DETAILED DESCRIPTION OF EMBODIMENTS OF THE INVENTION

Figure 9:
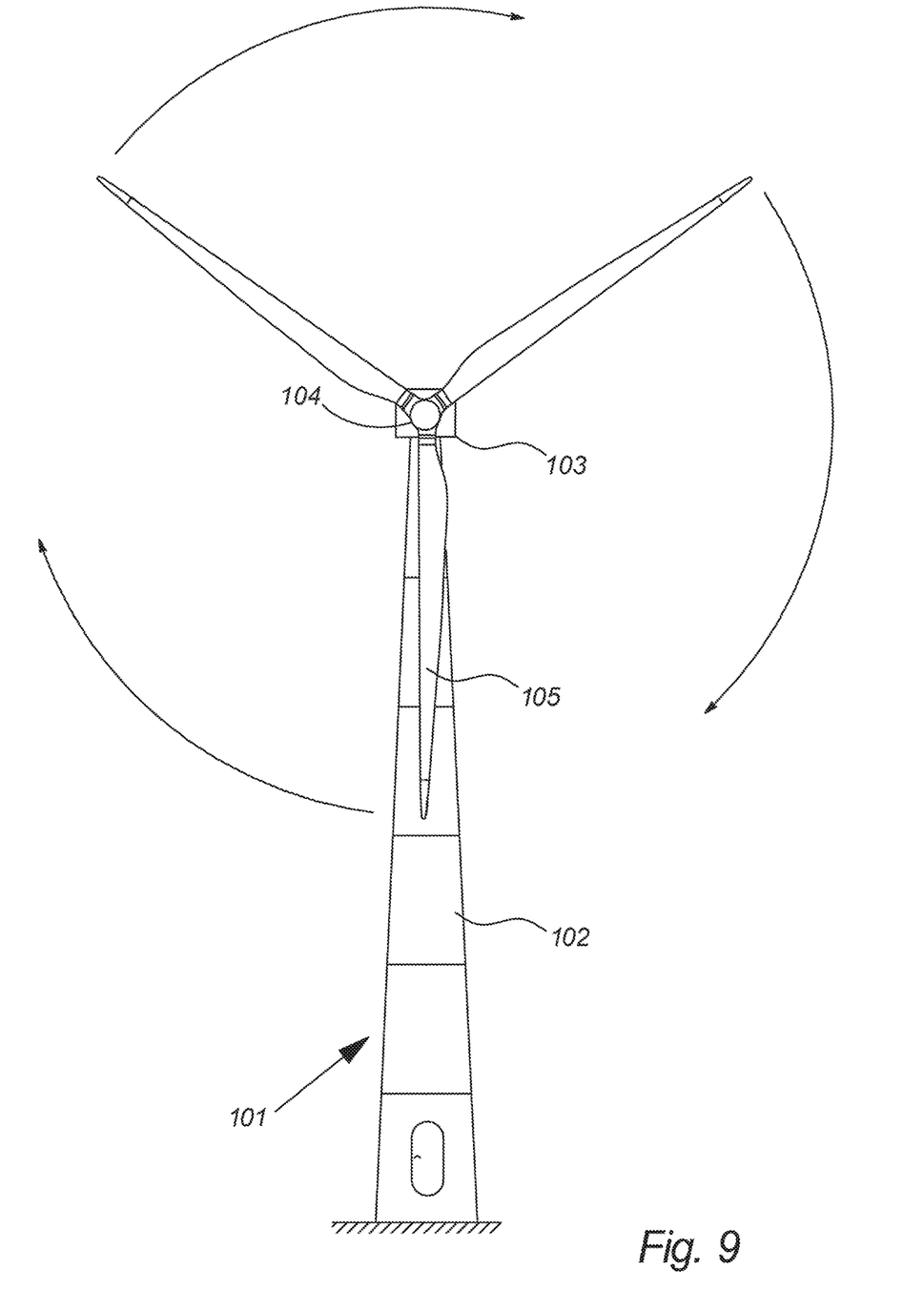
Figure 10:
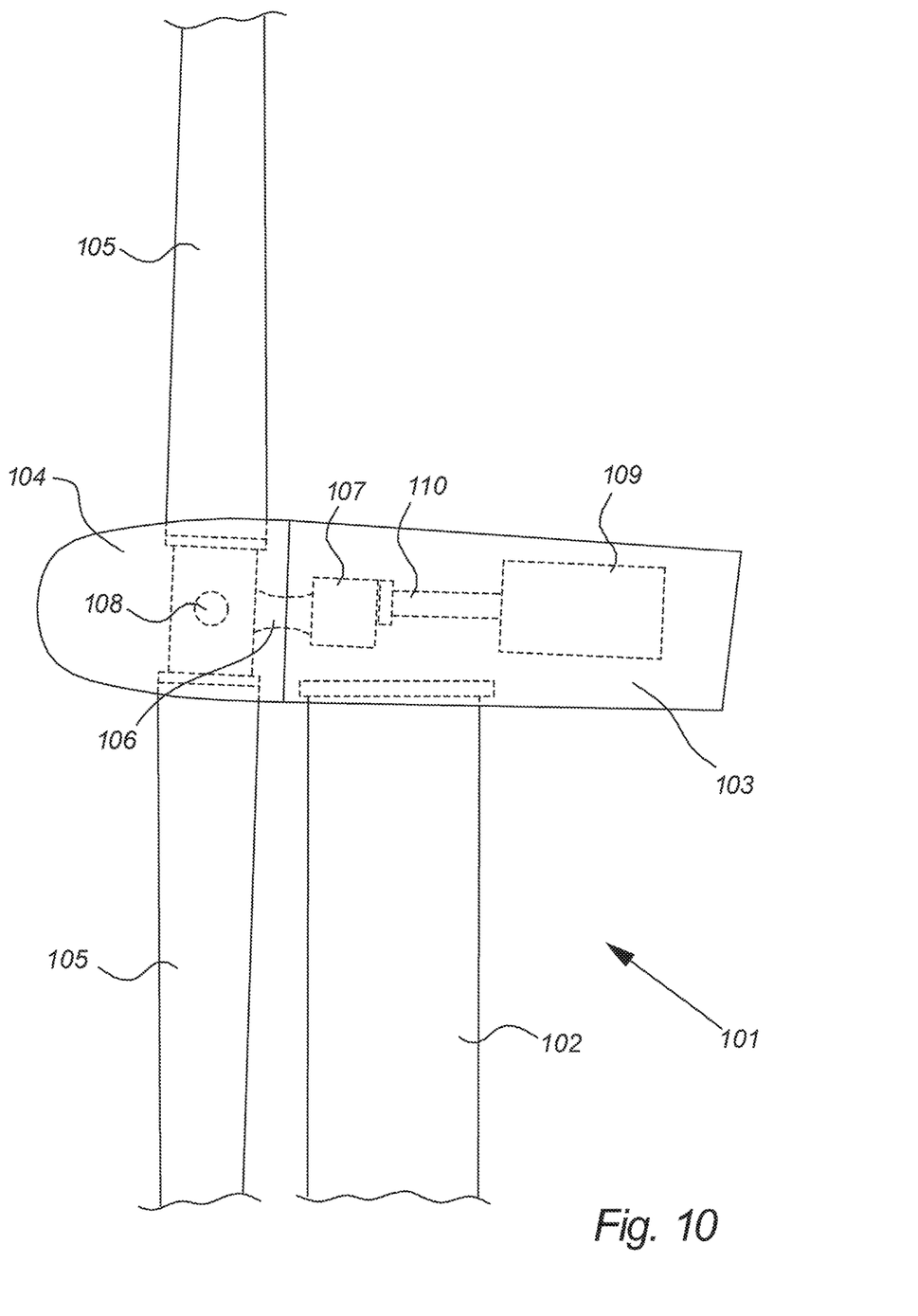
FIG. 10 illustrates a wind turbine nacelle, as seen from the side.

Reference will now be made to FIGS. 9 and 10 to illustrate an exemplary wind turbine for implementation of the planetary gear system as described herein. FIG. 9 illustrates a wind turbine 101, comprising a tower 102 and a wind turbine nacelle 103 positioned on top of the tower 102. The wind turbine rotor 104, comprising three wind turbine blades 105, is connected to the nacelle 103 through the low speed shaft 6 which extends out of the nacelle 103 front.

FIG. 10 illustrates an embodiment of a wind turbine nacelle 103, as seen from the side. The drive train in a traditional wind turbine 101 known in the art usually comprises a rotor 104 connected to a gearbox 107 by means of a low speed shaft 106. In this embodiment the rotor 104 comprise only two blades 105 connected to the low speed shaft 106 by means of a teeter mechanism 108, but in another embodiment the rotor 104 could comprise another number of blades 105, such as three blades 105, which is the most common number of blades 105 on modern wind turbines 101. In another embodiment the rotor 104 could also be connected directly to the gearbox 107.

The gearbox 107 is then connected to the generator 109 by means of a high speed shaft 110.

Because of the limited space in the nacelle 103 and to minimize the weight of the nacelle 103 the preferred gearbox 107 type in most modern wind turbines 101 is an epicyclic gearbox, but other gearbox types are also feasible, such as one or more spur gearboxes, worm gearboxes, helical gearboxes or a combination of different transmission and gearbox 107 types.

Figure 1:
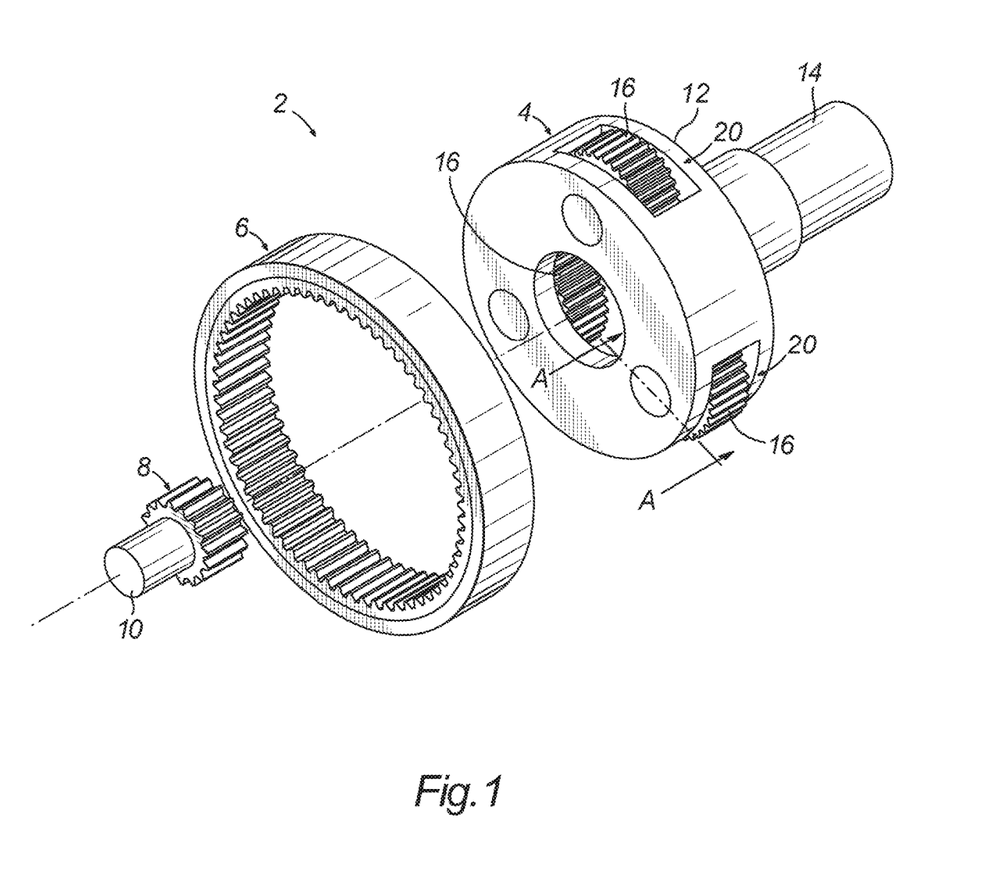
FIG. 1 is a perspective view of a planetary gear set, including a carrier assembly.

With reference to FIG. 1, a planetary gear system 2 includes a carrier assembly 4, a ring gear 6 and a sun gear 8 including a shaft 10. As FIG. 1 is an exploded view of the planetary gear system 2, the sun gear 8 is shown spaced from the carrier assembly 4. However, in practice the sun gear 8 would be positioned in the centre of the carrier assembly 4.

The carrier assembly 4 comprises a carrier 12 that is generally annular in form and which is coupled to or integrated with an input shaft 14. Although not shown, the input shaft 14 would be connected to a suitable driven load and, similarly, the output shaft 10 of the sun gear 8 would be coupled to a suitable prime mover. Both the load and the prime mover are not shown here for simplicity. Also, note that although the terms 'input' and 'output' have been used for the two shafts, this is for convention only and does not imply a limitation on the functionality of the respective shafts.

The carrier assembly 4 is formed as a generally hollow body defining opposed plate-like structures that support a plurality of planet gears 16. In FIG. 1 the planetary gear system 2 includes three planet gears 16, which is conventional, although it should be noted that planetary gear systems 2 may also have more or fewer than three planet gears. This invention applies to all such configurations.

It should be appreciated at this point that the planetary gear system 2 of FIG. 1 is simplified for the purposes of this discussion so that unnecessary detail does not obscure the essential features of the invention. Furthermore, the skilled person would understand that the planetary gear system 2 is simplified and, as such, a practical implementation would include more components that are specific to the particular application.

In the context of the invention, the planetary gear system 2 is configured for use in a high load application, for example as a speed increaser gear in a gearbox of a wind turbine generator. In such an application, the planetary gear system 2 is a large, heavy assembly that is subject to high loads and vibrations in use. As such, the components of the planetary gear system 2 will be made out of suitable materials. For example the carrier 12 may be formed from a single piece of cast and machined iron. The material used for the planet and sun gears may be carburized steel, and the ring gear may be an alloy steel.

Figure 2:
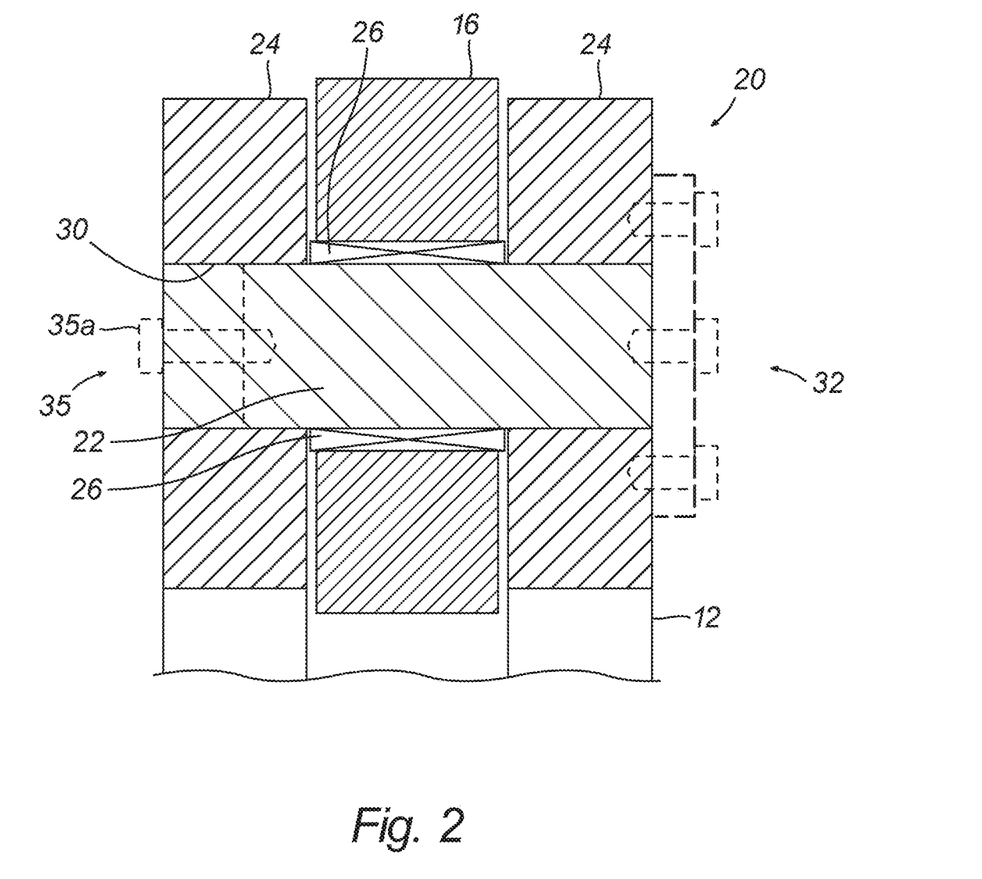
FIG. 2 is a section view along the line A-A in FIG. 1 which extends through the carrier assembly.

Returning to FIG. 1, but also with reference to FIG. 2, the carrier assembly 4 defines three fork structures 20, each of which supports a respective planet gear 16. Each planet gear 16 in the carrier assembly 4 is identical, so reference from now on will be made to one of the planet gears 16 in the carrier assembly 4 with specific reference to FIG. 2.

The planet gear 16 is rotatably mounted on a shaft or pin 22 that extends though the carrier 12 between the two arms 24 of the fork structure 20. The planet gear 16 is mounted on the shaft 22 by way of a bearing 26 so that the planet gear 16 is able to rotate freely in the fork structure 20. The bearing 26 is shown generally in FIG. 2, but it should be appreciated that any type of bearing would be suitable depending on the loading that would be applied to the planet gear, in use. For example a steel ball bearing race may be used, although in higher load applications cylindrical or tapered roller bearings may be more appropriate. Multiple bearings could also be used.

As can be seen in FIG. 2, the shaft 22 is received into a corresponding bore 30 defined in the forks by way of an interference fit. This is usually an effective way of locating the planet gears 16 in the carrier 12 without the use of mechanical fasteners such as bolts. It is also known to secure the shaft 22 using one or more bolts that would couple the shaft to a mounting plate fixed to the outer surface of the carrier. One such bolt-fixing arrangement is illustrated in dashed lines on FIG. 2 for completeness and is labelled as '32', and another is illustrated as '35' in which the shaft 22 does not extend all the way through the left hand bore 30, which is now blanked off by a bore cap 35*a*, and in which a bolt 35*a* extends through the bore cap 35*b* and secures the shaft 22. In either fixing approach, it is important that the shaft 22 does not move angularly in the bore 30. However, it has been observed in use that very high loads and dynamic deflections in combination with vibrations applied to the planetary gear system 2 can cause the shaft to deflect and even to twist in the bore 30, despite being press fit or bolted into it. In the case of a press fit, the deflection can cause severe wear or fretting corrosion on the cylindrical outer surface of the shaft 22 that, over time, can lead to premature failure of the associated planet gear. Similarly, in the case of the shaft 22 being bolted into the bore 30, the deflection can subject the bolt to significant shear loads. This can lead to failure of the bolt thereby resulting in a secondary failure of the carrier assembly and/or the ring gear. It is to this issue that the embodiments of the invention are addressed, in order to interlock the shaft 22 to the bore 30 so as to prevent the shaft from moving angularly with respect to the bore.

Specific embodiments of the invention will now be described with reference to FIGS. 1 to 8. Note that in each of the Figures, the embodiments are shown in an enlarged view of the carrier assembly in which the shaft 22 is shown surrounded by a region of the carrier 12 into which the shaft 22 is received. It should be appreciated that the planetary gear system of FIGS. 1 and 2 provides context for the embodiments of the invention that will now be described, although those embodiments are not specifically shown in FIGS. 1 and 2.

Figure 3:
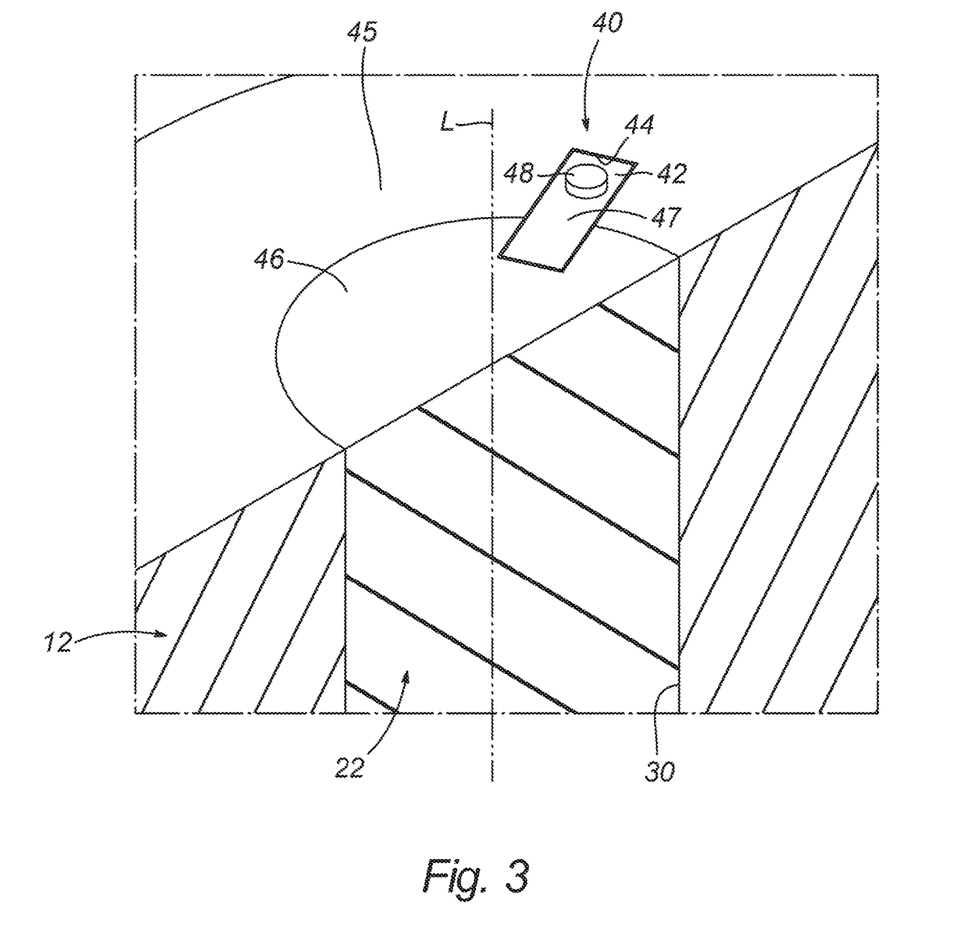
FIG. 3 is an enlarged perspective view of a part of the carrier assembly in FIG. 1, which incorporates interlocking means according to an embodiment of the invention.
Figure 4:
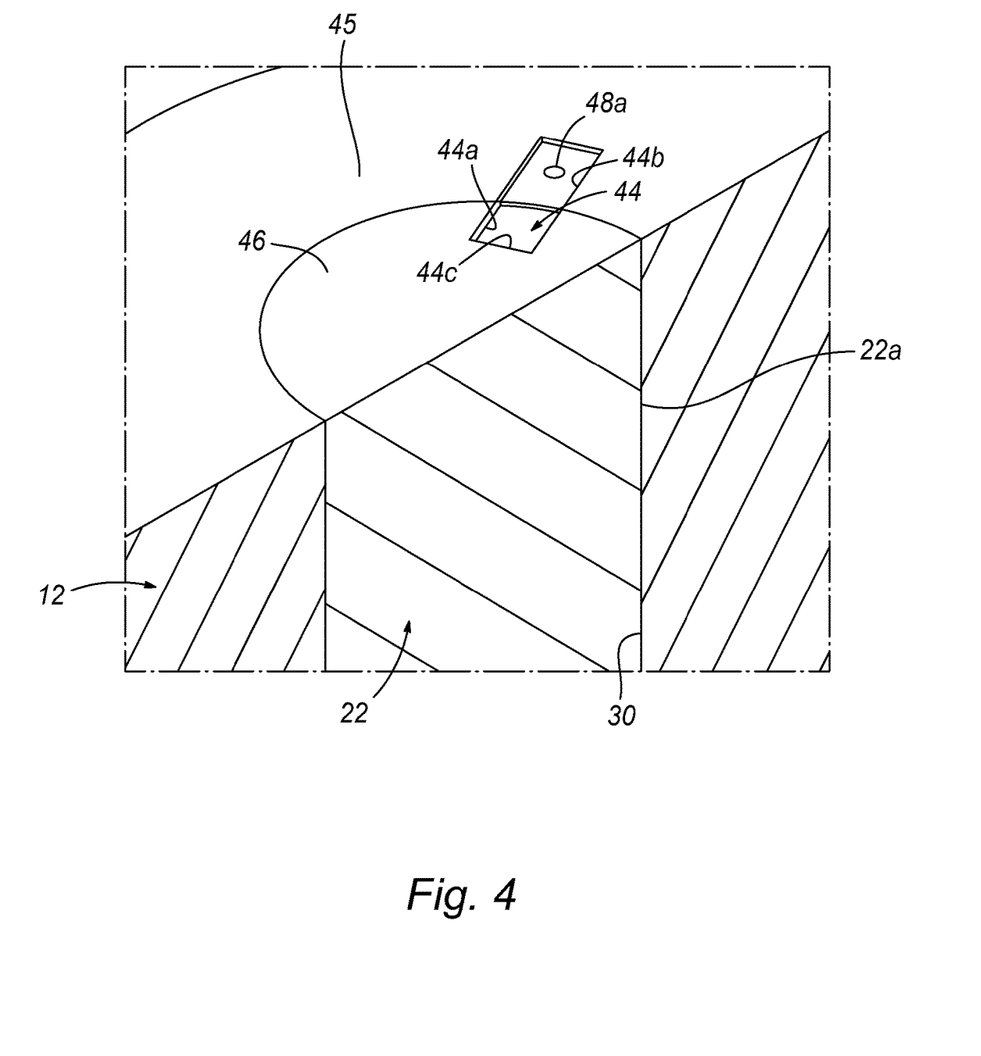
FIG. 4 is a view of the carrier assembly in FIG. 3, but with the interlocking means removed.

With reference firstly to FIGS. 3 and 4, the carrier 12 is provided with interlocking means 40 that prevents the shaft 22 moving angularly with respect to the bore 30 about the longitudinal axis L of the shaft 22.

In this embodiment, the interlocking means 40 is an interlocking element 42 that is plate-like in form. The locking element 42 is rectangular and fits into a complementary-shaped recess 44 defined partly by the end face 46 of the shaft 22 and partly by the surface 45 of the carrier 12 that surrounds or encircles the shaft. The recess therefore comprises two portions: a first recess portion 44*a* defined by the shaft 22 and a second recess portion 44*b* defined by the carrier 12. The first recess portion 44*a* includes a base wall 44*c* that is radially spaced from the sidewall 22*a* of the shaft 22. To illustrate this clearly, FIG. 4 shows the carrier assembly 4 with the locking element 42 removed from the recess 44. The depth of the recess 44 is comparable to the thickness of the interlocking element 42 so that an upper surface 47 of the interlocking element 42 lies substantially flush with the surface 45 of the carrier 12. The interlocking element 42 is coupled to the carrier 12 by a suitable fastener 48 such as a bolt, which is receivable in an associated threaded hole 48 *a* defined in the recess portion 44*b*. Alternatively, the interlocking element 42 could be secured to the shaft 22.

The interlocking element 42 prevents angular movement of the shaft 22 by means of the geometrical shape of the region of the interlocking element 42 that overlaps the second recess portion 44*a*. The edge of the interlocking element 42 is therefore an engagement feature that engages with the walls of the recess portion 44*a* to lock the shaft 22 in place against angular movement.

It should be appreciated that although the interlocking element 42 is shown in this embodiment as having a rectangular shape, this is not essential and the interlocking element 42 may have other forms whilst still functioning to interlock with the shaft 22 to guard against angular movement, by intersecting the shaft and the carrier. For example, the interlocking element 42 could be oval or circular in form whilst still achieving the same technical effect. In one embodiment, the interlocking element 42 could be configured to extend over a cut-out section of the end face of the shaft that is shaped to define a circular segment delineated by a chord line.

In the embodiment of FIGS. 3 and 4, the shaft 22 has been pressed into the bore 30 so the end face 46 of the shaft lies substantially flush with the surface 45 of the carrier 12. However, it is possible that during assembly the shaft 22 is installed into the bore 30 such that the end surface 46 of the shaft 22 lies slightly below the level of the surface 45 of the carrier 12. In this case, therefore, although the interlocking element 42 would prevent angular movement of the shaft 22, some axial movement may occur.

Figure 5A:
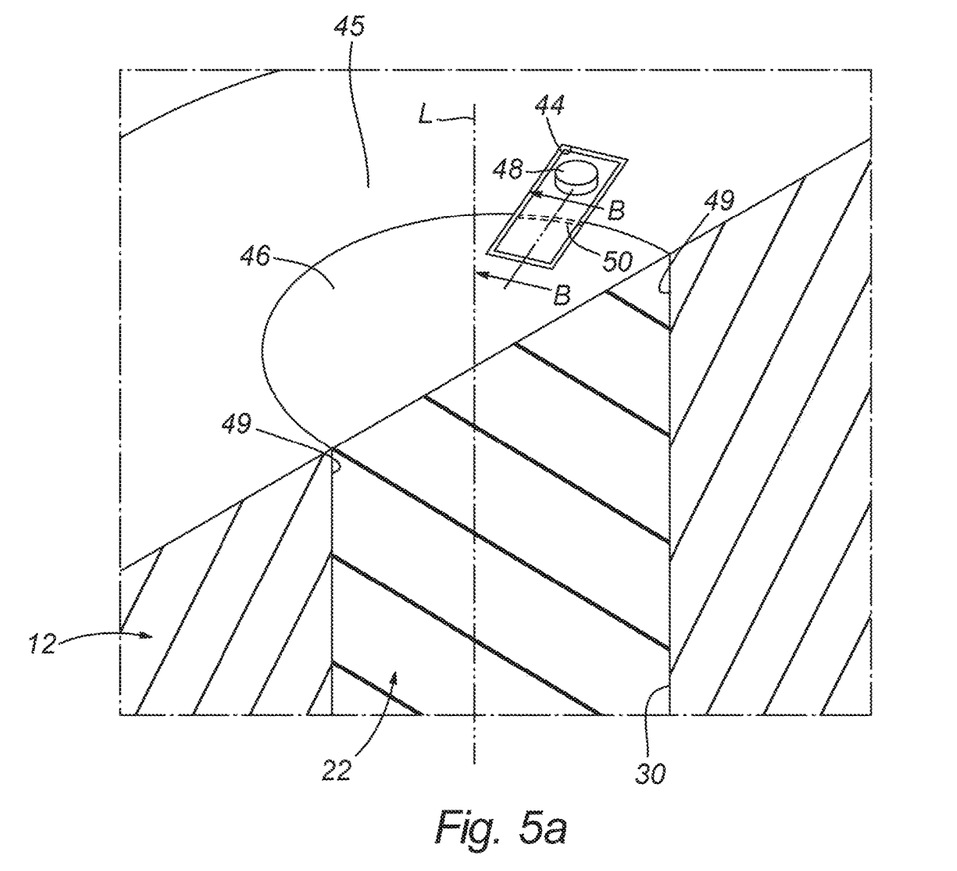
FIG. 5a is an enlarged perspective view of a part of the carrier assembly, similar to that of FIG. 3, but which shows interlocking means according to an alternative embodiment.
Figure 5B:
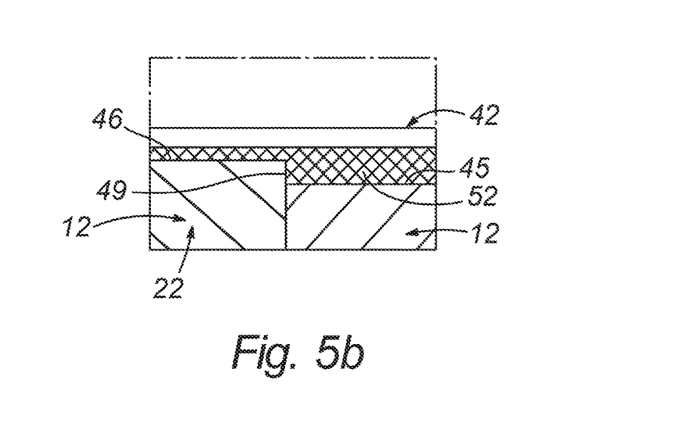

FIG. 5 illustrates an alternative embodiment which would also prevent movement of the shaft 22 with respect to the carrier 12 along the longitudinal axis L. This embodiment is very similar to the embodiment of FIGS. 3 and 4, so only the differences will be described, and the same reference numerals will be used to refer to common parts.

Here, it will be noted that the shaft 22 is located in the bore 30 such that the end face 46 of the shaft 22 protrudes slightly from the surrounding surface 45 of the carrier 12. An interlocking element 42 is provided in the same way as in the previous embodiment, although here the interlocking element 42 is resilient such that it conforms to the stepped transition 49 between the end face 46 of the shaft 22 and the surface 45 of the carrier 12. The resilience can be observed by the curvature lines indicated as 50. In this embodiment, the interlocking element 42 fits into the first recess portion 42 provided on the shaft 22, and the second recess 44 provided on the carrier 12.

The shaping of the interlocking element 42 so that it conforms to the stepped transition 49 is achieved by fastening the interlocking element 42 to the carrier 12 with the bolt 48. In this way, the interlocking element 42 effectively pre-loads the shaft 22 to provide an 'active lock' against any axial movement of the shaft 22 out of the bore 30. This is to be contrasted with the previous embodiment in which the upper surface 46 of the shaft 22 may lie slightly under the level of the surface 45 of the carrier 12, such that some axial movement of the shaft 22 could occur before being limited or restrained by the interlocking element 42.

A suitable material for the interlocking element in this case may be spring steel which would provide the necessary resilience for the interlocking element 42 but still be rigid enough to actively lock the shaft 22 against axial movement. Advantageously, therefore, the interlocking elements of FIGS. 3, 4 and 5 provide a dual function of preventing angular and axial movement of the shaft 22 with respect to the carrier 12.

With reference to FIG. 9, a similar effect is achievable by providing an interlocking element 42 with a relatively soft resilient layer 52 that sits adjacent to the surface 46 of the shaft 22. The resilient layer 52 could be silicon rubber for example, or another type of polymer. The resilient layer 52 could be bonded to the interlocking element 42 or it could simply be placed under the interlocking element and held in place as the element is fastened down onto the carrier. In this case, therefore, the resilient layer 52 conforms to the stepped transition between the shaft 22 and the carrier 12 and no deformation of the locking member 42 occurs.

Alternative embodiments will now be described with respect to FIGS. 6 and 7, where the same reference numerals are used to refer to parts in common with the previous embodiments. In these embodiments, the carrier assembly is also provided with interlocking means to prevent angular movement of the shaft 22 relative to the bore 30, and therefore the carrier 12, but in these cases the interlocking means is provided by cooperation between the shaft 22 and the carrier 12 rather than by the use of a separate interlocking element as in the previous embodiments.

Figure 6:
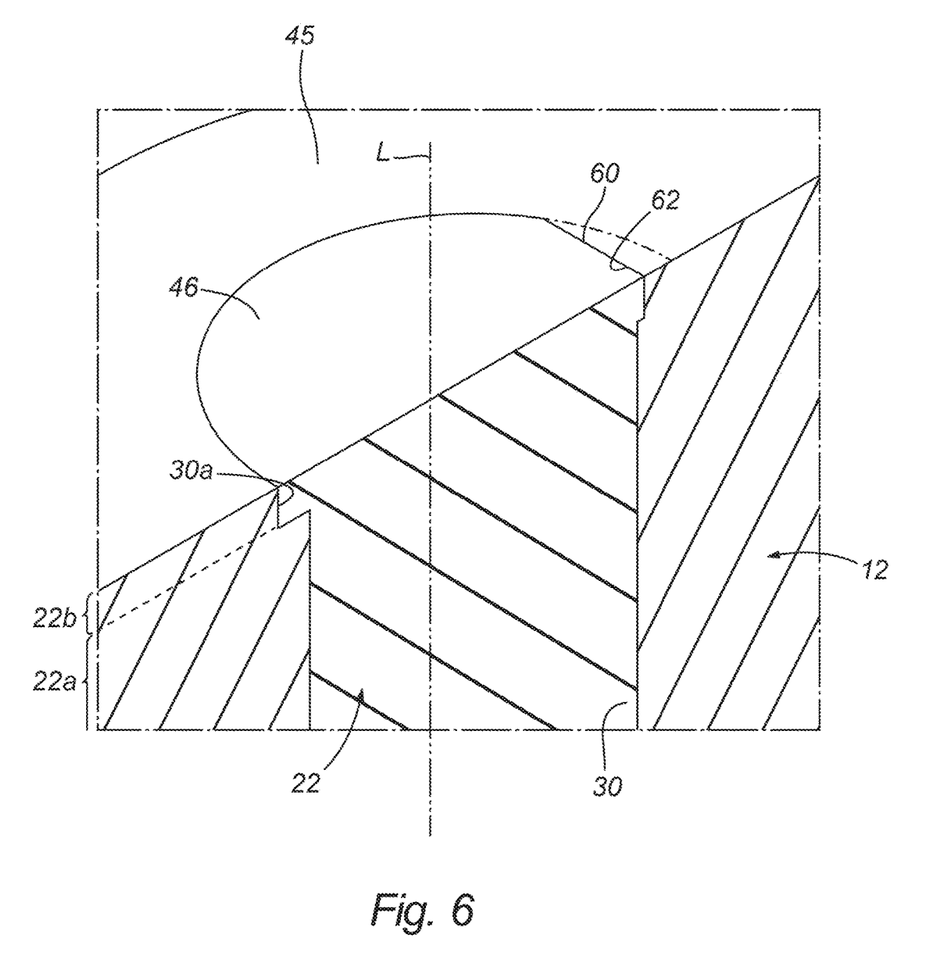
FIG. 6 is an enlarged perspective view of a part of the carrier assembly in FIG. 1, but which incorporates interlocking means in accordance with a further embodiment.

Turning firstly to FIG. 6, the shaft 22 in this embodiment includes a cylindrical body or 'shank' portion 22a and an enlarged head portion 22b or 'flange'. The plan profile of the head portion 22b is shaped so as to interlock with a correspondingly shaped upper or 'socket' portion 30a of the bore 30.

The head portion 22b of the shaft 22 is generally circular in plan profile but the interlocking means is provided by way of a flat section 60 which mates with a corresponding flat section 62 provided in the socket portion 30a of the bore 30. In effect, therefore, the shaft 22 is keyed to the bore 30 to prevent angular movement of the shaft about its longitudinal axis L with respect to the bore 30. Note that in FIG. 6 the flat section 60 is in contrast to the otherwise circular profile of the head portion 22b indicated by the dashed lines.

Forming the interlocking means as a single flat section on the head portion 22b of the shaft 22 is convenient to manufacture since only a relatively small section of material needs to be machined off from an otherwise circular flange. However, the shaft 22 may be configured with other head profiles. For example, the enlarged head region 22b may be shaped to define a polygonal profile and the socket portion 30 configured to define a matching shape.

Figure 7:
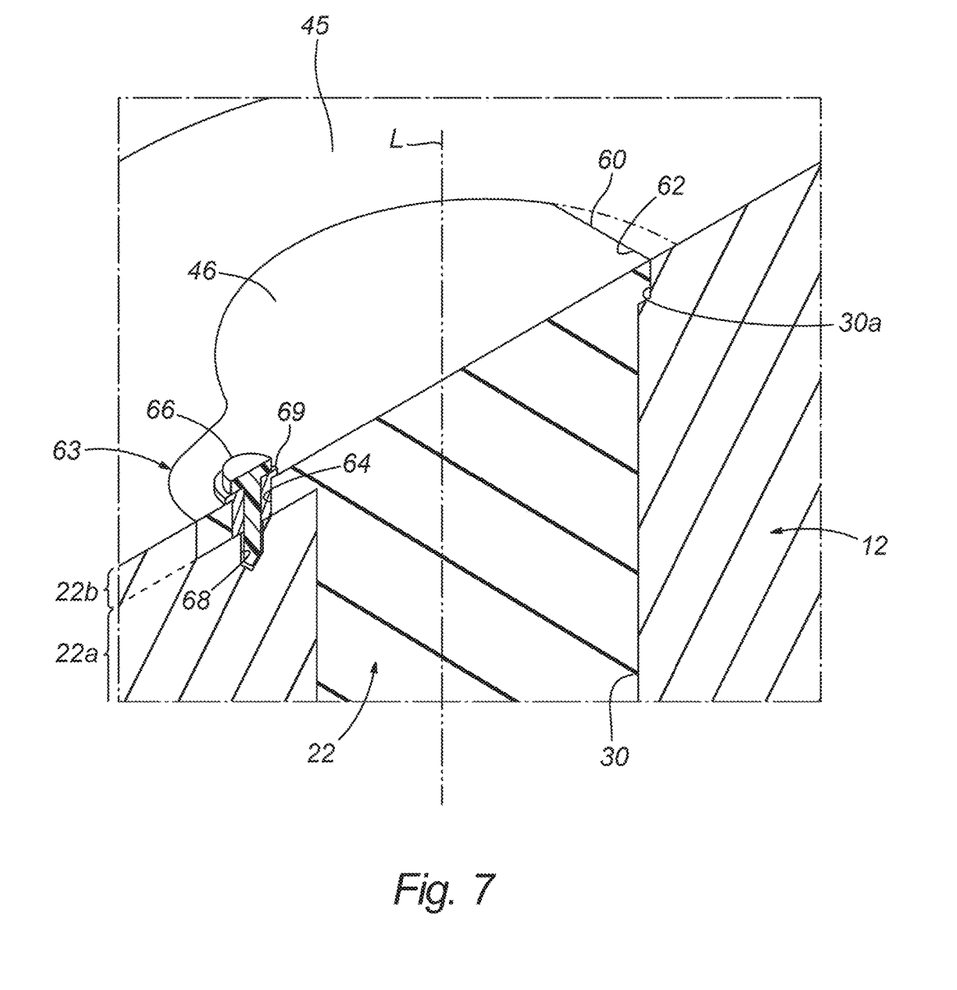
FIG. 7 is an enlarged perspective view of a part of the carrier assembly, similar to that of FIG. 6, but which shows interlocking means according to a further alternative embodiment.

Turning to FIG. 7, this embodiment is similar to the embodiment of FIG. 6 so only the differences will be described, and the same reference numerals will be used to refer to common parts. In this embodiment, the shaft 22 has a structure which prevents axial movement of the shaft 22 in the bore 30 in addition to preventing angular movement. In the same way as the previous embodiment, the shaft 22 includes a shank portion 22a that is cylindrical and an enlarged head portion 22b which is provided with a flat section 60 which engages with a correspondingly-shaped feature of a socket portion 30a of the bore 30.

In this embodiment, however, the head portion of the shaft 22 also includes a fixing location 63 which restrains movement of the shaft along its longitudinal axis L. The fixing location 63 point 62 is shown as defined by a lobe-shaped feature of the head portion 22b that extends beyond the circular profile of the shank portion 22a so that it can be secured to the carrier 12. In this embodiment the lobe-shaped feature of the head portion 22b actually works as the interlocking means such that the flat section 60 is not required; however, both may be present as well, as shown in FIG. 7. The fixing location 63 comprises a through-hole 64 through which a fastener 66 passes to secure onto the underlying surface of the carrier 12 via bore 68. A washer or shim 69 is provided for the fastener 66 to bear on the upper surface 46 of the shaft 22 over a larger contact area. Note that the through-hole 64 has a larger diameter than the fastener 66 so as to allow for inexact alignment between the fixing location 63 and the bore 68.

Some variations to the embodiments described above have already been mentioned. However, the skilled person will understand that other variations and modifications may be made to the specific embodiments without departing from the scope of the invention as defined by the claims.

Figure 8A:
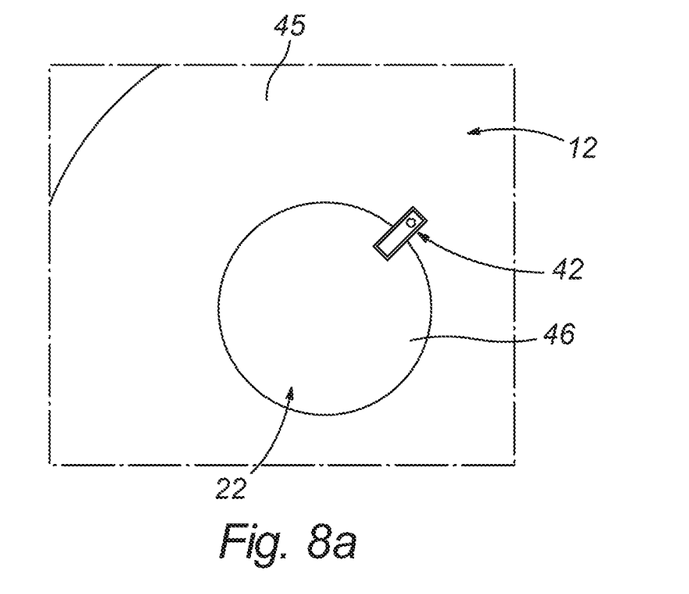
FIG. 8a is an enlarged top view of a part of the carrier assembly in FIG. 1, which incorporates locking means according to an alternative embodiment.
Figure 8B:
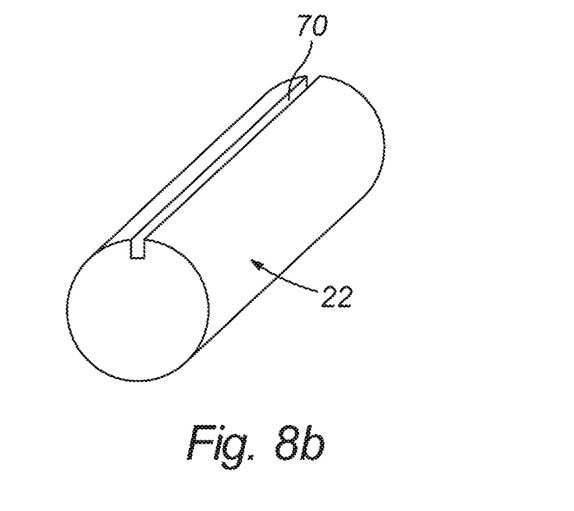
FIG. 8b is a perspective view of the planetary gear pin from the carrier assembly of FIG. 8a, FIG. 9 illustrates a large modern wind turbine, as seen from the front.

For example, in the embodiments of FIGS. 3 to 5, the interlocking means was provided by the interlocking element 42 engaging with a complementary feature defined in the upper face 46 of the shaft, thereby preventing angular movement thereof during high load conditions. One variant of this concept is illustrated by FIGS. 8a and 8b. Here, the interlocking element 42 is still embodied as a part that is fixed to the surface 45 or the carrier 12 and overlaps with the shaft 22 so as to engage with a correspondingly shaped feature defined by the shaft 22. However, in this embodiment, rather than being a simple recess 44 in the shaft 22, as in FIGS. 3 and 4, the feature is a rectangular-profiled slot or 'keyway' 70 that runs along the side surface of the shaft 22 in a longitudinal direction, as shown in FIG. 8b. The interlocking element 42 therefore acts as a key that engages the keyway 70 thereby preventing angular movement of the shaft in the bore 30. The keyway could also have a rounded profile, which may reduce stress concentrations in the keyway.

In FIG. 8b, the keyway 70 is shown as running along the entire length of the shaft 22. However, it should be appreciated that the keyway need not run along the entire length of the shaft 22 and may only run along a small portion of it sufficient to achieve the angular interlocking between the interlocking element 42 and the keyway 70.

Although the interlocking means is described as being provided on one end face of the shaft 22, note that the interlocking means could be provided on the other end face of the shaft 22, or indeed on both end faces of the shaft. Also, the angular interlocking means may be located at one end face of the shaft whilst the means to restrain axial movement of the shaft may be located at the other end face of the shaft.

In the embodiments described with reference to FIGS. 6 and 7, the enlarged head portion 22b is described as being integral with the shank portion 22a of the shaft 22. However, although it is envisaged that this structure would provide the most convenient means of manufacturing the shaft 22, it should be noted that this is not essential. As such, it is also envisaged that the enlarged head portion 22b could be manufactured as a separate part and then be mechanically fixed to the shank portion 22a by a suitable technique, for example using a mechanical faster such as a bolt.

The invention has been exemplified above with reference to specific examples. However, it should be understood that the invention is not limited to the particular examples described above but may be designed and altered in a multitude of varieties within the scope of the invention as specified in the claims.

The invention claimed is:

1. A wind turbine generator comprising a gearbox, wherein said gearbox comprises a planetary gear system, wherein said planetary gear system comprises a carrier assembly, wherein said carrier assembly comprises a carrier supporting at least one planetary gear that is rotatably mounted through a bearing on a shaft, wherein the shaft is fixed in a bore defined by the carrier, wherein the carrier assembly includes interlocking means to prevent angular movement of the shaft relative to the bore, wherein the interlocking means comprises an interlocking element associated with the carrier and a recess formed in a sidewall of the shaft and extending longitudinally along the shaft, wherein the recess is open to at least one end face of the shaft and includes a base wall radially spaced from the sidewall to define a fixed recess depth, and wherein the interlocking element extends from the carrier and into the recess through the sidewall of the shaft, and wherein the interlocking element exerts a pre-load on the shaft to prevent the shaft from moving axially relative to the bore.

2. The wind turbine generator of claim 1, wherein the interlocking element is a key, and wherein the recess of the shaft is a keyway defined in the shaft.

3. The wind turbine generator of claim 1, wherein said planetary gear system is made from steel or a surface hardened high-alloyed cast iron.

4. The wind turbine generator of claim 1, wherein the planetary gear system includes an input shaft, and wherein the input shaft is connected to a rotor of said wind turbine generator.

5. A wind turbine generator comprising a gearbox, wherein said gearbox comprises a planetary gear system, wherein said planetary gear system comprises a carrier assembly, wherein said carrier assembly comprises a carrier supporting at least one planetary gear that is rotatably mounted through a bearing on a shaft, wherein the shaft is fixed in a bore defined by the carrier, wherein the carrier assembly includes interlocking means to prevent angular movement of the shaft relative to the bore, and wherein the interlocking means comprises an interlocking element associated with the carrier and a recess formed in a sidewall of the shaft and extending longitudinally along the shaft, wherein the recess is open to at least one end face of the shaft and includes a base wall radially spaced from the sidewall to define a fixed recess depth, and wherein the interlocking element extends from the carrier and into the recess through the sidewall of the shaft, wherein the interlocking element is resilient so that it conforms to a stepped transition between the carrier and the shaft.

6. The wind turbine generator of claim 5, wherein the interlocking element has a resilient layer which conforms to the stepped transition between the carrier and the shaft.

* * * * *